United States Patent
Lai

(10) Patent No.: US 10,459,507 B2
(45) Date of Patent: Oct. 29, 2019

(54) METHOD, ELECTRONIC DEVICE, AND COMPUTER-READABLE RECORDING MEDIUM FOR SETTING SCREEN TIMEOUT TIME

(71) Applicant: Wistron Corporation, New Taipei (TW)

(72) Inventor: Chien-Heng Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 153 days.

(21) Appl. No.: 15/619,531

(22) Filed: Jun. 11, 2017

(65) Prior Publication Data

US 2018/0260012 A1 Sep. 13, 2018

(30) Foreign Application Priority Data

Mar. 8, 2017 (TW) .............................. 106107478 A

(51) Int. Cl.
| | | |
|---|---|---|
| *G06F 1/32* | (2019.01) | |
| *G06F 3/041* | (2006.01) | |
| *G06F 1/3228* | (2019.01) | |
| *G06F 1/3234* | (2019.01) | |

(52) U.S. Cl.
CPC .......... *G06F 1/3228* (2013.01); *G06F 1/3262* (2013.01); *G06F 1/3265* (2013.01); *G06F 3/0416* (2013.01)

(58) Field of Classification Search
CPC ...... G06F 1/3228; G06F 1/326; G06F 1/3265; G06F 3/0416
See application file for complete search history.

(56) References Cited

U.S. PATENT DOCUMENTS

| | | | |
|---|---|---|---|
| 9,250,688 B2 | 2/2016 | Jeganathan et al. | |
| 9,891,681 B2 | 2/2018 | Jeganathan et al. | |
| 2013/0283073 A1 | 10/2013 | Jeganathan et al. | |
| 2015/0062044 A1* | 3/2015 | Chen ..................... | G06F 1/3228 345/173 |
| 2015/0302823 A1* | 10/2015 | Lee ........................ | G09G 5/006 345/2.1 |

(Continued)

FOREIGN PATENT DOCUMENTS

TW 201631439 9/2016

OTHER PUBLICATIONS

"Office Action of Taiwan Counterpart Application," dated Feb. 6, 2018, p. 1-p. 7, in which the listed references were cited.

*Primary Examiner* — Afroza Chowdhury
(74) *Attorney, Agent, or Firm* — JCIPRNET

(57) ABSTRACT

A method, an electronic device, and a computer-readable recording medium for setting screen timeout time are proposed. The method is adapted to an electronic device having a touch screen and includes the following steps. First, touch operation performed by the user on the touch screen is detected to generate multiple touch operation time periods. An average touch operation time period is calculated according to the touch operation time periods. Next, a screen timeout time is set according to the average touch operation time period, where a non-touch operation time period is between every two consecutive touch operation time periods, and each of the non-touch operation time periods exceeds a predetermined idle time period.

21 Claims, 3 Drawing Sheets

(56) References Cited

U.S. PATENT DOCUMENTS

2016/0110051 A1\* 4/2016 Yuan .................... G06F 3/0416
                                                         345/173
2016/0132083 A1   5/2016 Jeganathan et al.
2017/0269772 A1\* 9/2017 Noto .................... G06F 3/0416

\* cited by examiner

METHOD, ELECTRONIC DEVICE, AND COMPUTER-READABLE RECORDING MEDIUM FOR SETTING SCREEN TIMEOUT TIME

CROSS-REFERENCE TO RELATED APPLICATION

This application claims the priority benefit of Taiwan application serial no. 106107478, filed on Mar. 8, 2017. The entirety of the above-mentioned patent application is hereby incorporated by reference herein and made a part of this specification.

TECHNICAL FIELD

The disclosure relates to a method, an electronic device, and a computer-readable recording medium for setting a screen, in particular to, a method, an electronic device, and a computer-readable recording medium for setting a screen timeout time.

BACKGROUND

To accommodate people's busy lifestyles, mobile electronic devices such as personal digital assistants, smart phones, tabular computers have become indispensable. As an example, a smart phone equipped with a touch screen may not only include each feature provided by a traditional communication device, but may also include a built-in operation system that carries out versatile tasks such as document editing, e-mail serving, web serving, multimedia playing, photo shooting, and instant communication, and thus its usage has surpassed all the other electronic devices. Thus, the endurance of such electronic device is critical to meet the user's satisfaction.

SUMMARY OF THE DISCLOSURE

Accordingly, a method, an electronic device, and a computer-readable recording medium for setting a screen timeout time are proposed, which not only set the screen timeout time getting closer to the user's usage habit but also enhance the endurance of the electronic device with smart energy saving and thereby enhance the user's experience.

According to one of the exemplary embodiments, the proposed method is adapted to an electronic device having a touch screen and includes the following steps. First, touch operation performed by the user on the touch screen is detected to generate multiple touch operation time periods. An average touch operation time period is calculated according to the touch operation time periods. Next, a screen timeout time is set according to the average touch operation time period, where a non-touch operation time period is between every two consecutive touch operation time periods, and each of the non-touch operation time periods exceeds a predetermined idle time period.

According to one of the exemplary embodiments, the proposed electronic device includes a touch screen, a memory, and a processor, where the processor is coupled to the touch screen and the memory. The touch screen is configured to display frames. The memory is configured to store data. The processor is configured to detect touch operation performed by a user on the touch screen to generate multiple touch operation time periods, to calculate an average touch operation time period according to the touch operation time periods, and to set the screen timeout time according to the average touch operation time period, where a non-touch operation time period is between every two consecutive touch operation time periods, and each of the non-touch operation time periods exceeds a predetermined idle time period.

According to one of exemplary embodiments, the proposed computer-readable recording medium records computer program to be loaded into an electronic device having a touch screen to execute the steps of the proposed method.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
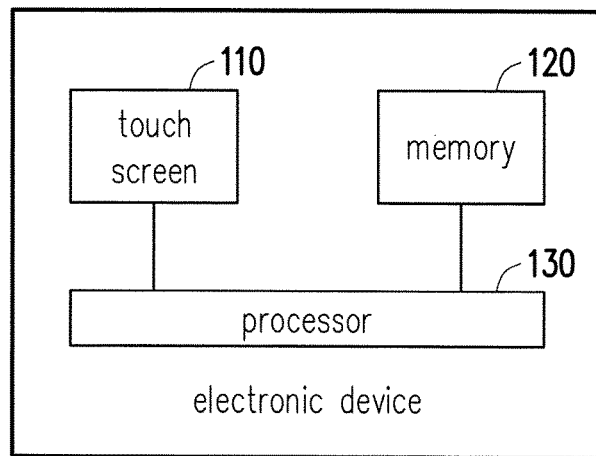
FIG. 1 illustrates a block diagram of an electronic device in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of an electronic device in accordance with one of the exemplary embodiments of the disclosure. All components of the electronic device and their configurations are first introduced in FIG. 1. The functionalities of the components are disclosed in more detail in conjunction with FIG. 2.

Referring to FIG. 1, an electronic device 100 would at least include a touch screen 110, a memory 120, and a processor 130. In the present embodiment, the electronic device 100 may be a smart phone, a tabular computer, a personal digital assistant, an e-book, a digital camera, and so forth. The disclosure is not limited in this regard.

The touch screen 110 may be a display integrated with touch detection components, which may provide a display feature as well as an input feature. Such display may be a liquid crystal display (LCD), a light-emitting diode (LED) display, a field emission display (FED) or other types of displays., and yet the disclosure is not limited thereto. The touch detection components would be arranged in rows and columns in the display for detecting a touch input by a finger, a palm, or other objects from the touch screen 110. The touch detection components may be, for example, capacitive touch detection components, surface acoustic wave touch detection components, electromagnetic touch detection components, optical touch detection components, or near-field imaging touch detection components, and yet the disclosure is not limited thereto.

The memory 120 would be configured to store data such as codes and parameter settings and may be one or a combination of a stationary or mobile random access memory (RAM), a read-only memory (ROM), a flash memory, a hard drive, other similar devices or integrated circuits.

The processor 130 would be configured to control operations among the components of the electronic device 100 and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), an application processor (AP) or other similar devices or a combination of the aforesaid devices.

Figure 2:
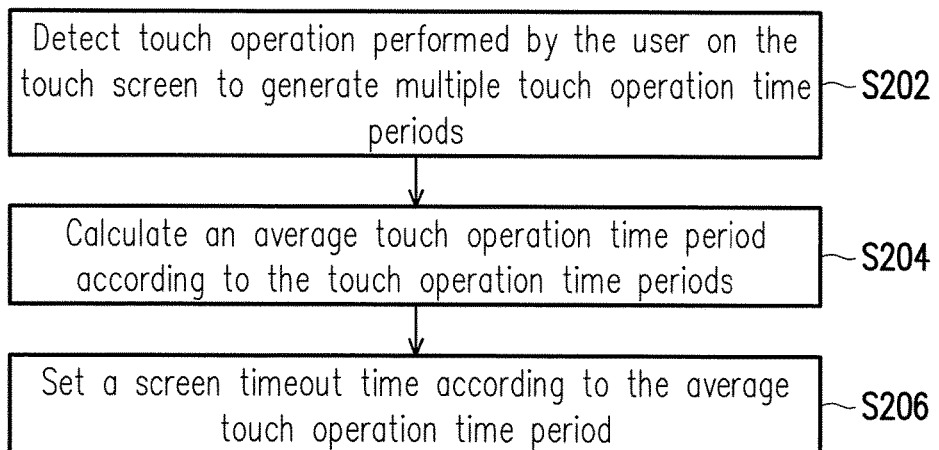
FIG. 2 illustrates a flowchart of a method for setting a screen timeout time in accordance with one of the exemplary embodiments of the disclosure.

FIG. 2 illustrates a flowchart of a method for setting a screen timeout time in accordance with one of the exemplary embodiments of the disclosure. Detailed steps of how the electronic device 100 performs its method for setting a screen timeout would be illustrated along with each component hereafter.

Referring to both FIG. 1 and FIG. 2, the processor 130 would first detect touch operation performed by the user on the touch screen 110 to generate multiple touch operation time periods (Step S202). The processor 130 may register a listener that listens to touch events on the touch screen 110 at an operating system (OS) level of the electronic device 100 so as to record operation time points performed by the user on the touch screen 110. For example, the listener could be onTouchListener in Android OS.

Herein, once the processor 130 detects the touch operation performed by the user on the touch screen 110, it would start accumulating its operation time until the touch operation has not been detected for over a time period (referred to as "a predetermined idle time period" hereafter, e.g. 5 seconds) and would accordingly generate an operation record. Once the processor 130 detects the touch operation performed again by the user on the touch screen 110, it would start accumulating another operation time until the touch operation has not been detected for over the predetermined idle time period and accordingly generate another operation record. The processor 130 would repeat the same steps until a certain number of operation records have been collected.

Figure 3A:
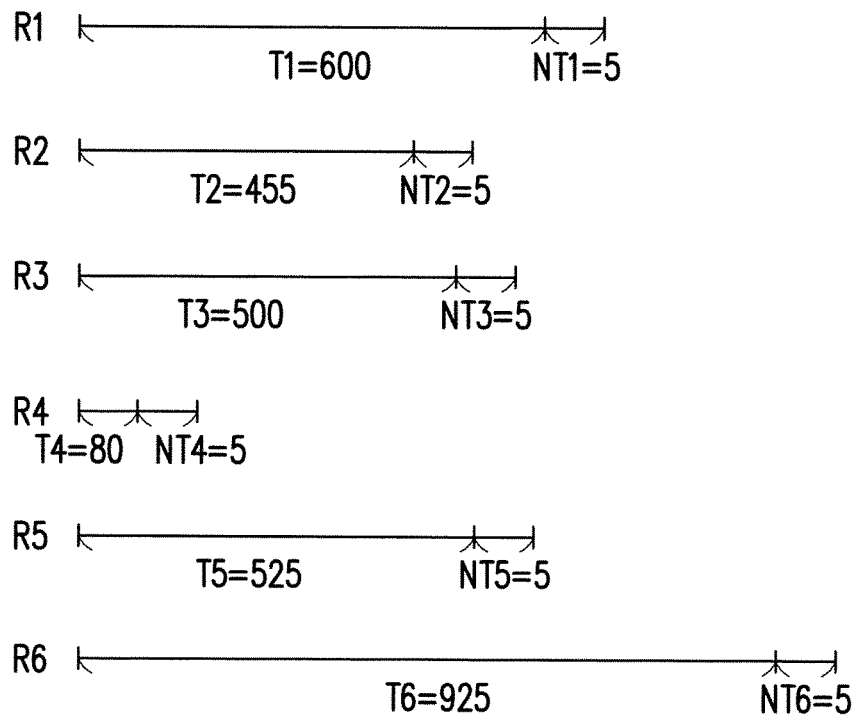
FIG. 3A and FIG. 3B illustrates schematic diagrams of operation records in accordance with one of the exemplary embodiments of the disclosure.
Figure 3B:
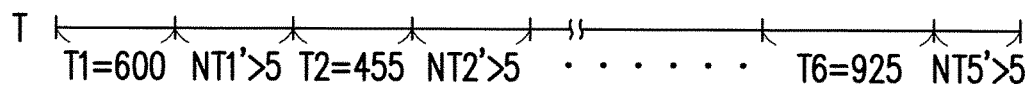

For example, FIG. 3A and FIG. 3B illustrates schematic diagrams of operation records in accordance with one of the exemplary embodiments of the disclosure.

Referring to FIG. 3A, in the present exemplary embodiment, the processor 130 would obtain six operation records R1-R6. The operation records R1-R6 respectively include touch operation time periods T1-T6 with time periods of 600 seconds, 455 seconds, 500 seconds, 80 seconds, 525 seconds, and 925 seconds as well as non-touch operation time periods NT1-NT6 all with time periods of 5 seconds. It should be noted that, since the processor 130 stops accumulating after the predetermined idle time period (5 seconds), all the non-touch operation time period NT1-NT6 are recorded as 5 seconds. However, from the perspective of a consecutive time axis T as illustrated in FIG. 3B, the non-operation touch time periods (denoted as NT1'-NT6' herein) in fact could be more than 5 seconds, where any idle time exceeds 5 seconds would not be accumulated and recorded.

Referring back to FIG. 2, the processor 130 would next calculate an average touch operation time period according to the touch operation time periods (Step S204) and set a screen timeout time according to the average touch operation time period (Step S206). Herein, the processor 130 would determine the user's usage habits on the electronic device 100 according to the previously-recorded touch operation time periods to adaptively set the screen timeout time. In an exemplary embodiment, the processor 130 would set the mean of all the touch operation time periods as the average touch operation time period. However, in the present exemplary embodiment, since extreme values may considerably affect the mean, the processor 130 would remove the longest touch operation time period and the shortest touch operation time period and then calculate the mean of the remaining touch operation time periods to be set as the average touch operation time period.

Take FIG. 3A as an example. The processor 130 would first remove the touch operation time period T6 (i.e. the longest touch operation time period with 925 seconds) and the touch operation time period T4 (i.e. the shortest touch operation time period with 80 seconds) and set the mean of the remaining touch operation time periods (520 seconds) as the average touch operation time period.

In the present exemplary embodiment, the processor 130 would set the screen timeout time according to the duration of the average touch operation time period. Moreover, the processor 130 may allow the user to preset a time relation between touch operation and screen timeout to a positive relation or a negative relation. That is, the processor 130 would receive a selection operation performed on one of the time relations between touch operation and screen timeout by the user through an input module (not shown). In another exemplary embodiment, the processor 130 could directly preset the time relation between touch operation and screen timeout time to the positive relation or the negative relation without user selection.

In terms of the positive relation, the longer the average touch operation time period of the user is, the longer the screen timeout time is set. Assume that the user normally operates the electronic device 100 with longer time, and then the screen timeout time could be set longer. For example, when the average touch operation time period exceeds 10 minutes, the screen timeout time could be set to 60 seconds; when the average touch operation time period is between 5-10 minutes, the screen timeout time could be set to 30 seconds; when the average touch operation time period is between 3-5 minutes, the screen timeout time could be set to 20 seconds; when the average touch operation time period is within 3 minutes, the screen timeout time could be set to 10 seconds. As an example, in FIG. 3A, since the average touch operation time period is between 5-10 minutes, the processor 130 would set the screen timeout time to 30 seconds.

In terms of the negative relation, the longer the average touch operation time period of the user is, the shorter the screen timeout time is set. Assume that the user normally operates the electronic device 100 more frequently and yet with short time periods, and then the screen timeout time could be set longer. For example, when the average touch operation time period exceeds 10 minutes, the screen timeout time could be set to 10 seconds; when the average touch operation time period is between 5-10 minutes, the screen timeout time could be set to 20 seconds; when the average touch operation time period is between 3-5 minutes, the screen timeout time could be set to 30 seconds; when the average touch operation time period is within 3 minutes, the screen timeout time could be set to 60 seconds. As an example, in FIG. 3A, since the average touch operation time period is between 5-10 minutes, the processor 130 would set the screen timeout time to 20 seconds.

For dynamic and adaptive adjustment, the processor 130 would reset the screen timeout time after every certain number of touch operation time periods are generated. In other words, the processor 130 would set the screen timeout time according to the user's recent operation behavior. As an example in FIG. 3A, after the processor 130 obtains six touch operation time periods and set the screen timeout time, it would detect another six new touch operation time periods to calculate a new average touch operation time period and reset the screen timeout time in a similar fashion as illustrated in Step S206. For better comprehension, an application of the proposed method would be illustrated in the following embodiment.

Figure 4:
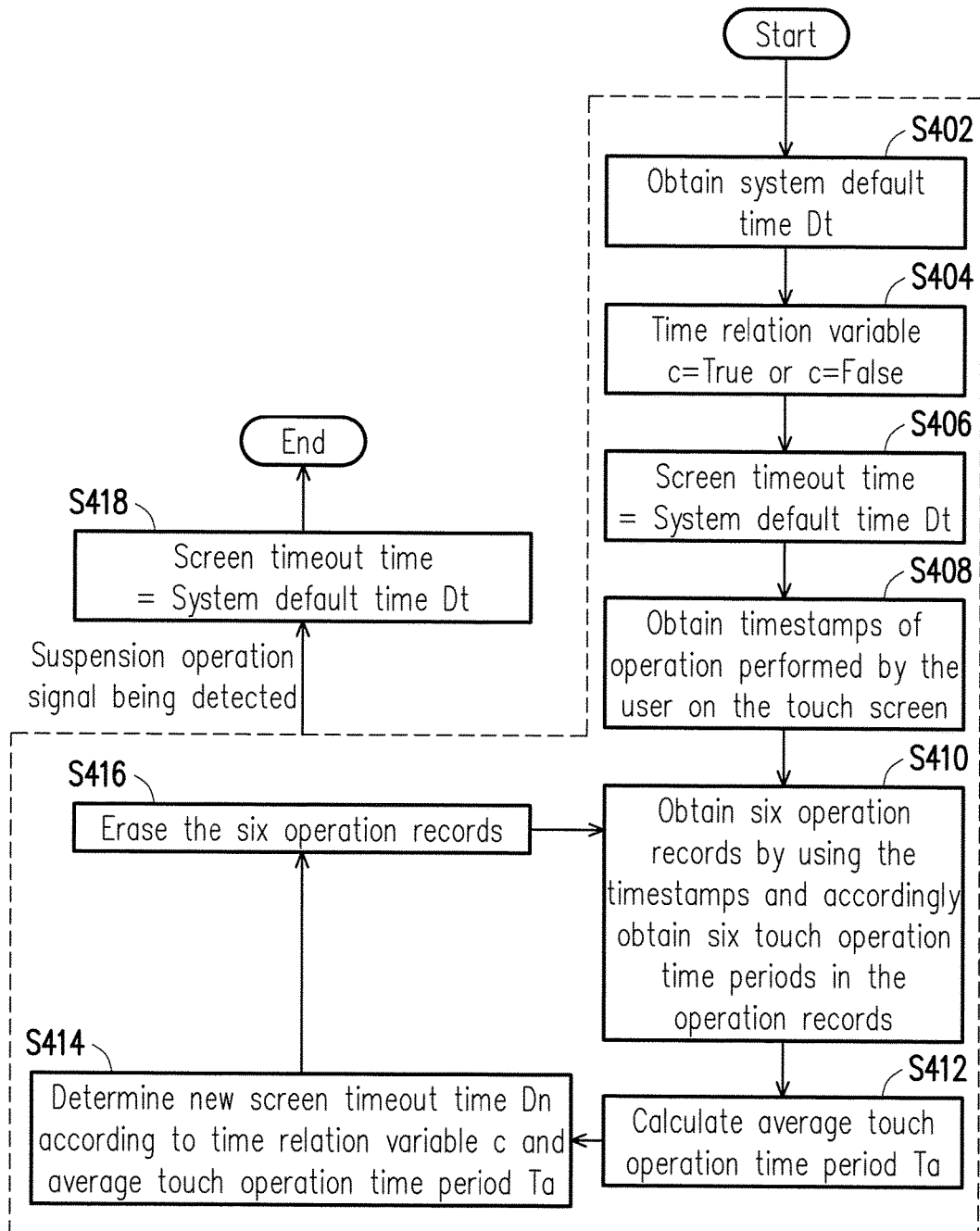
FIG. 4 illustrates a flowchart of a method for setting a screen timeout time in accordance with one of the exemplary embodiments of the disclosure.

FIG. 4 illustrates a flowchart of a method for setting a screen timeout time in accordance with one of the exemplary embodiments of the disclosure. The steps in FIG. 4 could also be implemented by all components of the electronic device 100 as illustrated in FIG. 1.

Referring to both FIG. 1 and FIG. 4, since no touch operation record has been stored in the memory 120, the processor 130 would obtain a system default of a screen timeout time (i.e. a system default time Dt) (Step S402) and receive a selection operation performed on one of time relations between touch operation and screen timeout by the user to determine whether a positive relation or a negative relation would be preferred by the user, where a time relation variable c may be a Boolean value, c=True represents the positive relation and c=False represents the negative relation (Step S404). It should be noted that, in another exemplary embodiment, the time relation variable c in Step S404 may be the positive relation or the negative relation preset by the processor 130, and the user's selection operation would be omitted.

Next, the processor 130 would initialize the screen timeout time as the system default time Dt (Step S406) and enter a dynamic setting process of the screen timeout time. The processor 130 may register a listener that listens to touch events on the touch screen 110 at the OS level of the electronic device 100 so as to obtain timestamps of operation performed by the user on the touch screen 110 (Step S408). The processor 130 would obtain six operation records by using the timestamps and accordingly obtain six touch operation time periods in the operation records (Step S410, similar to Step S202). The processor 130 would discard the records with the longest and the shortest operation time periods and calculate an average of the remaining four touch operation time periods to obtain an average touch operation time period Ta (Step S412, similar to Step S204).

Next, the processor 130 would determine a new screen timeout time Dn according to the time relation variable c selected by the user in Step S404 and the average touch operation time period Ta (Step S414, similar to Step S206) and to set the screen timeout time to Dn through an application programming interface (API) in the OS. Once the processor 130 updates the screen timeout time, it would erase the six operation records (Step S416) and return to Step S410 to obtain another six new consecutive touch operation time periods for setting a next screen timeout time.

Moreover, the processor 130 could create a thread to wait on the user to suspend the screen timeout time setting process of the electronic device 100. Such process could come after any of Step S402-S416. When the processor 130 receives a suspend operation signal set by the user through the input module (not shown) to stop detecting the touch screen 110 (Step S418), it would reset the screen timeout time back to the system default time Dt, erase all related data to release memory space in the memory 120, and end the screen timeout time setting process of the electronic device 100.

In summary, the method, the electronic device, and the computer-readable recording medium for setting a screen timeout time proposed in the disclosure dynamically adjust the screen timeout time through detecting operation time of the touch screen performed by the user. Accordingly, the disclosure not only sets a screen timeout time which gets closer to the user's usage habit but also enhance the endurance of the electronic device with smart energy saving and thereby enhance the user's experience.

The disclosure also provides a non-transitory computer readable medium, which records computer program to be loaded into an electronic device having a touch screen to execute the steps of the aforementioned method. The computer program is composed of a plurality of program instructions (for example, an organization chart, establishing program instruction, a table approving program instruction, a setting program instruction, and a deployment program instruction, etc), and these program instructions are loaded into the electronic device and executed by the same to accomplish various steps of the method for setting the screen timeout time.

In view of the aforementioned descriptions, the method, the electronic device, and the computer-readable recording medium proposed in the disclosure dynamically adjust a screen timeout time through detecting operation time of the touch screen performed by the user. Accordingly, the disclosure not only sets a screen timeout time which gets closer to the user's usage habit but also enhance the endurance of the electronic device with smart energy saving and thereby enhance the user's experience.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for setting a screen timeout time, applicable to an electronic device having a touch screen, wherein the method comprises the following steps:
   detecting touch operation performed by a user on the touch screen to generate a plurality of touch operation time periods, wherein a non-touch operation time period is between every two consecutive touch operation time periods, and wherein each of the non-touch operation time periods exceeds a predetermined idle time period;
   calculating an average touch operation time period according to the touch operation time periods; and
   setting the screen timeout time according to the average touch operation time period.

2. The method according to claim 1, wherein the step of detecting the touch operation performed by the user on the touch screen to generate the touch operation time periods comprises:
   accumulating an operation time of the touch operation performed by the user on the touch screen; and
   stop accumulating the operation time of the touch operation when the touch operation has not been detected for over the predetermined idle time period to accordingly generate one of the touch operation time periods.

3. The method according to claim 1, wherein the step of calculating the average touch operation time period according to the touch operation time periods comprises:
   removing a longest touch operation time period and a shortest touch operation time period from the touch operation time periods; and
   calculating a mean of the touch operation time periods with the longest touch operation time period and the shortest touch operation time period being removed so as to obtain the average touch operation time period.

4. The method according to claim 1, wherein before the step of setting the screen timeout time according to the average touch operation time period, the method further comprises:
   generating a time relation setting between touch operation and screen timeout, wherein the time relation setting is a positive relation or a negative relation.

5. The method according to claim 4, wherein the step of generating the setting of the time relation between touch operation and screen timeout comprises:
   providing a plurality of time relations between touch operation and screen timeout, wherein the time relations comprise the positive relation and the negative relation; and
   receiving a selection operation performed by the user on one of the time relations to accordingly generate the time relation setting.

6. The method according to claim 4, wherein the time relation setting is the positive relation, and wherein the step of setting the screen timeout time according to the average touch operation time period comprises:
   setting the screen timeout time according to the average touch operation time period and the positive relation, wherein the longer the average touch operation time period is, the longer the screen timeout time is set.

7. The method according to claim 4, wherein the time relation setting is the negative relation, and wherein the step of setting the screen timeout time according to the average touch operation time period comprises:
   setting the screen timeout time according to the average touch operation time period and the negative relation, wherein the longer the average touch operation time period is, the shorter the screen timeout time is set.

8. The method according to claim 1, wherein before the step of generate the touch operation time periods, the method further comprises:
   setting a system default time as the screen timeout time.

9. The method according to claim 1, wherein after the step of setting the screen timeout time according to the average touch operation time period, the method further comprises:
   detecting a plurality of new touch operation time periods performed by the user on the touch screen;
   calculating a new average touch operation time period according to the new touch operation time periods; and
   resetting the screen timeout time according to the new average touch operation time period.

10. The method according to claim 1 further comprises:
    receiving a suspend operation signal set by the user to stop detecting the touch screen; and
    setting a system default time as the screen timeout time.

11. An electronic device comprising:
    a touch screen, configured to display frames;
    a memory, configured to store data; and
    a processor, coupled to the touch screen and the memory, and configured to detect touch operation performed by a user on the touch screen to generate a plurality of touch operation time periods, to calculate an average touch operation time period according to the touch operation time periods, and to set the screen timeout time according to the average touch operation time period, wherein a non-touch operation time period is between every two consecutive touch operation time periods, and wherein each of the non-touch operation time periods exceeds a predetermined idle time period.

12. The electronic device according to claim 11, wherein the processor accumulates an operation time of the touch operation performed by the user on the touch screen and stops accumulating the operation time of the touch operation when the touch operation has not been detected for over the predetermined idle time period to accordingly generate one of the touch operation time periods.

13. The electronic device according to claim 11, wherein the processor removes a longest touch operation time period and a shortest touch operation time period from the touch operation time periods and calculates a mean of the touch operation time periods with the longest touch operation time period and the shortest touch operation time period being removed so as to obtain the average touch operation time period.

14. The electronic device according to claim 11, wherein before the processor sets the screen timeout time according to the average touch operation time period, the processor further generates a time relation setting between touch operation and screen timeout, wherein the time relation setting is a positive relation or a negative relation.

15. The electronic device according to claim 14, wherein the processor provides a plurality of time relations between touch operation and screen timeout and receives a selection operation performed by the user on one of the time relations to accordingly generate the time relation setting, wherein the time relations comprise the positive relation and the negative relation.

16. The electronic device according to claim 14, wherein the time relation setting is the positive relation, wherein the processor sets the screen timeout time according to the average touch operation time period and the positive relation, and wherein the longer the average touch operation time period is, the longer the screen timeout time is set.

17. The electronic device according to claim 14, wherein the time relation setting is the negative relation, wherein the processor sets the screen timeout time according to the average touch operation time period and the negative relation, and wherein the longer the average touch operation time period is, the shorter the screen timeout time is set.

18. The electronic device according to claim 11, wherein before the processor generates the touch operation time periods, the processor further sets a system default time as the screen timeout time.

19. The electronic device according to claim 11, wherein after the processor sets the screen timeout time according to the average touch operation time period, the processor further detects a plurality of new touch operation time periods performed by the user on the touch screen, calculates a new average touch operation time period according to the new touch operation time periods, and resets the screen timeout time according to the new average touch operation time period.

20. The electronic device according to claim 11, wherein the processor further receives a suspend operation signal set by the user to stop detecting the touch screen and sets a system default time as the screen timeout time.

21. A non-transitory computer-readable recording medium, recording programs to be loaded into an electronic device having a touch screen to perform steps of:
   detecting touch operation performed by a user on the touch screen to generate a plurality of touch operation time periods, wherein a non-touch operation time period is between every two consecutive touch operation time periods, and wherein each of the non-touch operation time periods exceeds a predetermined idle time period;
   calculating an average touch operation time period according to the touch operation time periods; and
   setting the screen timeout time according to the average touch operation time period.

* * * * *